United States Patent Office 3,162,632
Patented Dec. 22, 1964

3,162,632
PREPARATION OF CYANURIC FLUORIDES
Franciszek Olstowski, Freeport, Tex., assignor to The Dow Chemical Company, Midland, Mich., a corporation of Delaware
No Drawing. Filed July 17, 1962, Ser. No. 210,543
5 Claims. (Cl. 260—248)

This invention relates to a method for preparing cyanuric fluorides and more particularly is concerned with a process for preparing such fluorides by reacting cyanuric chloride, i.e. cyclic $(CNCl)_3$, with an alkali metal fluosilicate. The term cyanuric fluoride as used herein includes both the cyclic chloro-fluoro substituted s-triazines and the completely fluorinated s-triazines, i.e. $C_3N_3Cl_2F$, $C_3N_3ClF_2$ and $(CNF)_3$.

It is a principal object of the present invention to provide a process for preparing cyanuric fluorides which uses easily handled, non-corrosive, relatively non-toxic alkali metal fluosilicates as fluorination agents.

It is another object of the present invention to provide a fluorination process for preparing cyanuric fluorides which can be carried out at relatively low temperatures.

It is a further object of the present invention to provide a process employing relatively inexpensive alkali metal fluosilicate fluorinating agents which will react with cyanuric chloride to yield fluorinated products without having to employ an organic solvent having a high dielectric constant as is employed when sodium fluoride is used as fluorinating agent with cyanuric chloride.

These and other objects and advantages will become apparent from the detailed description presented hereinafter.

In accordance with the instant process, cyanuric chloride (2,4,6-trichloro-1,3,5-triazine) is reacted with an alkali metal fluosilicate (alkali metal silicofluoride) in the presence of an inorganic acidic reaction promoter, preferably, substantially anhydrous iron (III) chloride ($FeCl_3$), at a temperature of from about 50 to about 250° C. In this process, the molar ratio of alkali metal fluosilicate ($M_2SiF_6$ where M is an alkali metal) to cyanuric chloride [$(CNCL)_3$] ranges from about 0.1 to about 10. Preferably the fluosilicate to $(CNCl)_3$ molar ratio is from about 0.5 to about 3.

Although any of a number of inorganic acidic reaction promoters (i.e. fluosilicate decomposition agents) such as $CrCl_3$, $SbCl_5$, $HCl$, etc., for example, are satisfactory for use in the present process, ferric chloride because of its pronounced reactivity at the relatively low reaction temperatures and pressures employed ordinarily is used.

The amount of substantially anhydrous chloride reaction promoter to be employed ranges from about 1 to about 45 percent by weight and preferably from about 10 to about 40 weight percent based on the total amount of solids, i.e. cyanuric chloride alkali metal fluosilicate and inorganic chloride charge. The higher concentration of chloride, i.e. 45 weight percent, is not limiting with respect to the operability of the process. However, there is no apparent process advantage in exceeding this value.

Although any of the alkali metal fluosilicates are operable in the present process, ordinarily either sodium fluosilicate or potassium fluosilicate, because of their readily availability and relatively low cost, are employed.

The process is carried out over a temperature range of from about 50° C. to about 250° C. and preferably at from about 75 to about 200° C. at a pressure of from about 0.1 to about 10 atmospheres. The use of either subatmospheric or superatmospheric pressures is not critical to the progress of the reaction. Therefore, ordinarily for ease of operation the process is carried out at atmospheric pressure. The reaction time varies inversely with the reaction temperatures although ordinarily the actual time employed ranges from about 0.5 to about 2 hours or more.

The process is carried out in conventional nonpressurizable or pressurizable stationary or rotatable reactor vessels and allied equipment as known to one skilled in the art. The process can be carried out in a batch-type, continuous, cyclic or other type operation. The materials of construction to be used for reactors and allied processing equipment are not critical except these should not react detrimentally with the reactants or reaction products and should have the physical characteristics and structural strength to stand up under the reaction temperatures and pressures employed.

The cyanuric fluorides prepared by the present process are suitable for use as intermediates in the preparation of cyanogen fluoride, other perfluorocarbons such as $CF_4$, $C_2F_6$, $C_2F_4$, etc., trifluoro acetonitrile and the like materials.

In the production of cyanuric fluorides by the present process, silicon tetrafluoride can result as a co-product. This readily can be collected and converted to fluosilicic acid ($H_2SiF_6$) by reaction with water. Reaction of this acid with alkali metal chloride, e.g. sodium chloride, regenerates the corresponding alkali metal fluosilicate which can be recycled for additional reaction.

The following examples will serve to illustrate further the process of the present invention but are not meant to limit it thereto.

Example 1

The following reactants were mixed and placed in a 1 inch diameter Pyrex glass tube reactor about 12 inches long.

$Na_2SiF_6$ _____ 19 grams (~0.1 gram mole).
$(CNCl)_3$ _____ 19 grams (~0.1 gram mole).
$FeCl_3$ (Anhydrous) __ 30 grams (44 weight percent of total charge).

One end of the reactor was open and was was connected to a water-cooled receiver. The reactor was slowly heated. As the temperature of the solid mix in the reactor reached about 45° C., gas evolution began. Heating was continued until the reactor temperature reached about 150° C. whereupon a liquid condensate appeared in the water-cooled receiver. After this temperature was reached heating at temperature ranging from about 140 to about 160° C. was continued for about 45 minutes during which time continuous gas evolution from the mix and liquid product condensation in the receiver was observed. At the end of this period, gas evolution ceased and no more condensate appeared in the receiver.

A total of about 8 cubic centimeters of liquid product was obtained. This product, when analyzed by infrared methods, was shown to contain about 8 grams of 2,4-dichloro-6-fluoro-s-triazine and about 2.6 grams of 2-chloro-4,6-difluoro-s-triazine.

The total product yield of cyanuric chlorofluorides, based on the amount of cyanuric chloride charged was about 65 percent.

Example 2

The reactor employed in Example 1 was charged with about 22 grams $K_2SiF_6$ (about 0.1 gram mole) about 18.4 grams $(CNCl)_3$ (about 0.1 gram mole) and about 5 grams (about 11 weight percent of total charge) of substantially anhydrous $FeCl_3$. The reactor and contents were slowly heated, a rapid gas evolution beginning at about 68° C. Analysis by infrared technique of the noncondensable gases which passed through the receiver indicated these consisted primarily of $SiF_4$. After reaching this temperature, the reactor was continuously heated over a 30 minute period during which time the temperature rose from about 70° C. to about 170° C. The liquid condensate collected in the water-cooled receiver during this period upon analysis was found to contain about 75 volume percent of 2,4-dichloro-6-fluoro-s-triazine and about 25 volume percent of 2-chloro-4,6-difluoro-s-triazine.

*Example 3*

The following reactant mixture was charged to the same reactor system described for Example 1.

$Na_2SiF_6$ _____ 18.8 grams (~0.1 gram mole).
$(CNCl)_3$ _____ 18.4 grams (~0.1 gram mole).
Anh. $FeCl_3$ _____ 20 grams (about 35 weight percent of total charge).

The reaction mass was slowly heated until a product reflux temperature of about 130° C. was reached. By the time this temperature was reached, rapid gas evolution was observed emanating from the reactant mass and a liquid condensate was observed in the water-cooled receiver. The reaction was continued at this temperature for another 75 minutes until gas evolution from the reactant mixture stopped. About 7.4 cubic centimeters of a clear liquid weighing about 10.2 grams was recovered from the condensor vessel. Infrared analysis showed the product liquid contained about 44 volume percent 2,4-dichloro-6-fluoro-s-triazine. Yield of the cyanuric chlorofluoride, based on $(CNCl)_3$ charged, was about 55 percent.

As a control, a binary mixture of about 18.4 grams $(CNCl)_3$ and about 18.8 grams of $Na_2SiF_6$ without the ferric chloride reaction promoter, was placed in the Pyrex glass tube reactor. The reactor was slowly heated. No gas evolution was observed, even at temperatures as high as 120° C. As the temperature reached about 194° C. after about 0.5 hour, the cyanuric chloride was observed refluxing in the cooler portion of the reactor, but still no gas production was detected. The reactants were maintained within the temperature range between about 194–120° C. for an additional hour. During this run at no time was fluorosilicate decomposition detected. (There was no $SiF_4$ evolution.) Also, analysis indicates that no fluorochlorotriazines were found to have been produced.

In a manner similar to that shown for the foregoing examples, the other alkali metal fluorosilicates, $LiSiF_6$, $CsSiF_6$ and $RbSiF_6$ can be employed as fluorinating agents along with $CrCl_3$, $SbCl_5$, and other inorganic acid halides in the present process.

Various modifications can be made in the present invention without departing from the spirit or scope thereof for it is understood that I limit myself only as defined in the appended claims.

I claim:
1. A process for preparing cyanuric fluorides which comprises; reacting at a temperature of from about 50 to about 250° C. cyanuric chloride with an alkali metal fluosilicate in the presence of a fluorosilicate decomposition agent selected from the group consisting of substantially anhydrous $CrCl_3$, $SbCl_5$, $FeCl_3$ and HCl, the molar ratio of said alkali metal fluosilicate to said cyanuric chloride ranging from about 0.1 to about 10 and the amount of said fluorosilicate decomposition agent ranging from about 1 to about 45 weight percent of the total amount of the reaction mass.

2. The process as defined in claim 1 wherein the fluorosilicate decomposition agent is substantially anhydrous iron (III) chloride.

3. A process for preparing cyanuric fluorides which comprises:
(1) heating at a temperature of from about 75° C. to about 200° C. a mixture of (a) cyanuric chloride, (b) alkali metal fluosilicate selected from the group consisting of sodium fluosilicate and potassium fluosilicate, and (c) substantially anhydrous iron (III) chloride, the molar ratio of said fluosilicate to said cyanuric chloride ranging from about 0.5 to about 3 and the amount of said iron (III) chloride ranging from about 10 to about 40 weight percent of the total mixture,
(2) continuing the heating of said mixture over that period of time for which gas evolution continues from said mixture, and
(3) collecting the cyanuric fluoride products.

4. A process for preparing chlorofluoro triazines which comprises:
(1) providing a reaction mixture of about equal molar quantities of cyanuric chloride and an alkali metal fluosilicate selected from the group consisting of sodium fluosilicate and potassium fluosilicate which mixture also contains from about 10 to about 45 percent substantially anhydrous iron (III) chloride, the weight of said iron (III) chloride based on the total charge weight,
(2) heating the mixture at a temperature of from about 70 to about 170° C. for a period of from about 0.5 to about 2 hours,
(3) separating the chlorofluoro triazine products from the reaction mixture, and,
(4) recovering the flourinated triazine products in liquid form.

5. The process as defined in claim 4 wherein the chlorofluoro-substituted triazine products are composed primarily of a mixture of 2,4-dichloro-6-fluoro-s-triazine and 2-chloro-4,6-difluoro-s-triazine.

References Cited in the file of this patent
UNITED STATES PATENTS

| | | |
|---|---|---|
| 2,924,624 | Forshey | Feb. 9, 1960 |
| 2,937,171 | Smith | May 17, 1960 |

FOREIGN PATENTS

| | | |
|---|---|---|
| 567,073 | Belgium | May 14, 1958 |
| 863,408 | Great Britain | Mar. 22, 1961 |
| 873,251 | Great Britain | July 19, 1961 |

OTHER REFERENCES

Tullock et al.: J. Org. Chem., vol. 25, pages 2016 to 2019 (November 1960).

Dahmlos: Angew. Chemie, vol. 71, pages 274 to 276 (1959).

Belohlav et al.: Industrial and Engineering Chemistry, vol. 52, pages 1015 to 1019 (December 1961).

Smolin et al.: "s-Triazines and Derivatives," pages 52 to 53 and 62, Interscience Publishers, Inc. (1959).

Klemm: Inorganic Chemistry, vol. 1, pages 239 to 244 (1948), published by Office of Military Government for Germany, Dieter Rischse Verlagsbuchhandlung.